United States Patent [19]

Pinkerton et al.

[11] Patent Number: 4,474,488

[45] Date of Patent: Oct. 2, 1984

[54] RETAINER SYSTEM FOR ROOF-MINE TOOL BIT

[75] Inventors: Cletis P. Pinkerton, Mentor; Robert L. Morris, Painesville, both of Ohio

[73] Assignee: Mining Tools Div. of Smith International, Inc., Newport Beach, Calif.

[21] Appl. No.: 494,080

[22] Filed: May 12, 1983

[51] Int. Cl.³ .............................................. F16D 1/00
[52] U.S. Cl. ..................................... 403/24; 403/349; 175/410
[58] Field of Search .............. 403/348, 349, 361, 329, 403/328, 356, 24; 285/401, 402; 175/410, 413

[56] References Cited

U.S. PATENT DOCUMENTS

| | | | |
|---|---|---|---|
| 363,122 | 5/1887 | Dimick | 285/402 |
| 788,200 | 4/1905 | Finch | 285/402 X |
| 1,001,376 | 8/1911 | Elsas | 403/349 X |
| 2,092,060 | 9/1937 | Gairing | 403/348 X |
| 2,158,120 | 5/1939 | Hirschberg | 403/361 X |
| 3,764,153 | 10/1973 | Miller | 403/359 X |
| 4,361,196 | 11/1982 | Hoyle, Jr. | 403/348 X |
| 4,361,353 | 11/1982 | Vinson | 285/401 X |

Primary Examiner—Andrew V. Kundrat
Attorney, Agent, or Firm—Watts, Hoffmann, Fisher & Heinke Co.

[57] ABSTRACT

A retainer system for detachably coupling a drill bit to a drill steel member when the drill bit is provided with key-way recess portions adapted to telescopingly and-/or rotatably receive an interlocking relationship therein correspondingly shaped key-way members carried by the drill steel member.

2 Claims, 13 Drawing Figures

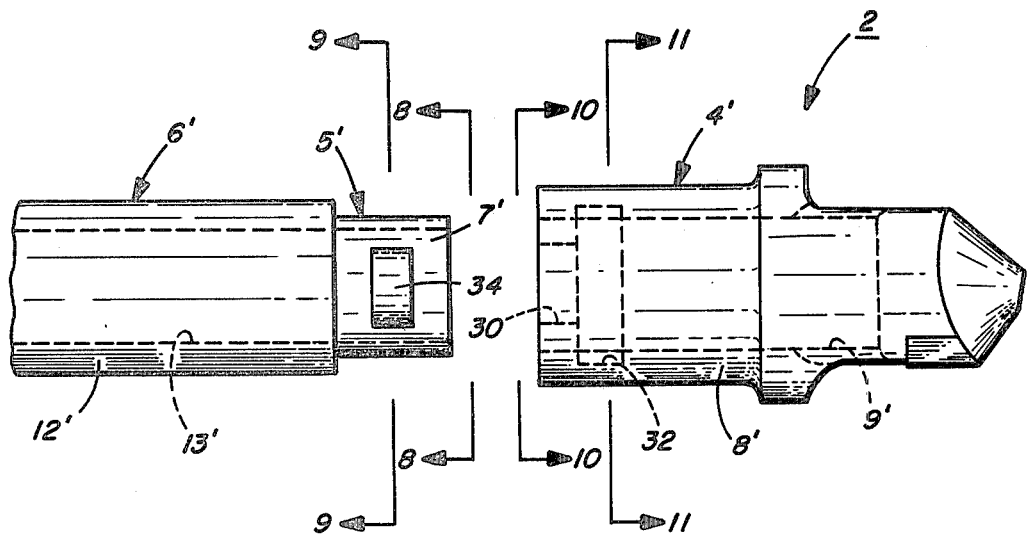
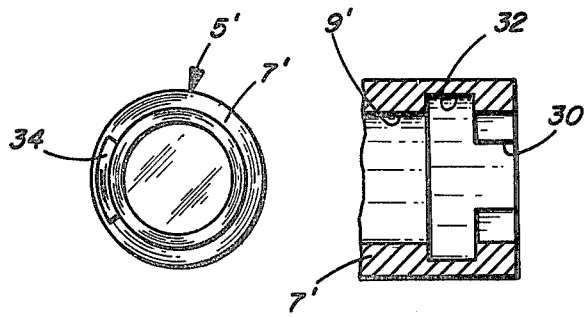
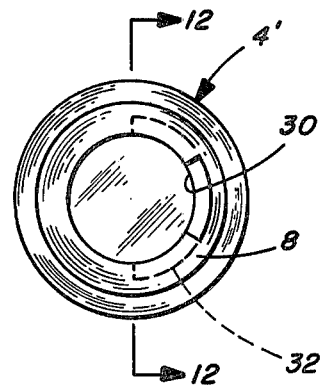
FIG. 8  FIG. 12  FIG. 10
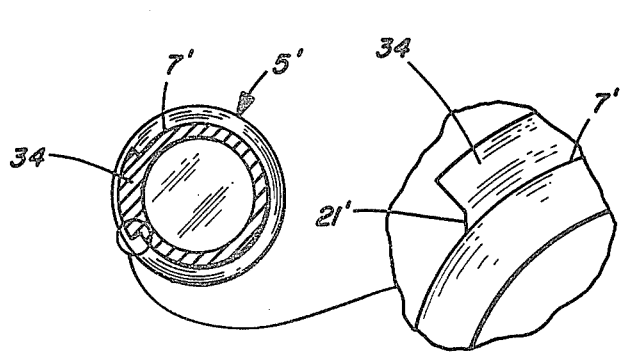
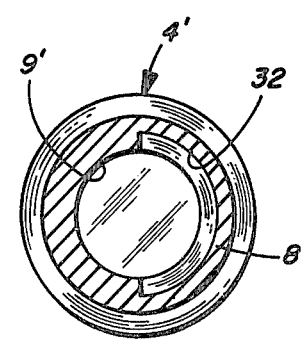
FIG. 9  FIG. 13  FIG. 11

RETAINER SYSTEM FOR ROOF-MINE TOOL BIT

DESCRIPTION

1. Technical Field

The present invention relates to roof drill bits and more specifically to a retainer system for detachably coupling a drill bit of the type utilized in drilling coal, rock, mineral ore and other hard substances to a drive or drill steel which provides the rotative power for the drilling operations.

2. Background Art

The present invention contemplates a retainer system for detachably coupling a drill bit to a drive member conventionally referred to as a drill steel which, in turn, is coupled to a drive motor for rotatably driving the drill bit for various drilling and excavating operations. Accordingly, such cutter bit may be of a solid head construction or may be of a generally hollow construction with dust receiving passages for removing cuttings and dust resulting from the drilling operation. Such type of cutter bit, for example, is illustrated in applicant's U.S. Pat. No. 4,201,421. The solid type cutter head is illustrated in U.S. Pat. No. 3,434,554. Accordingly, the present invention contemplates a retainer system for detachably coupling these component parts for use with various type drill bit configurations.

In the past, various arrangements have been provided for detachably connecting the cutter bit to the drill steel. In one form the cutter bit and drill steel have been provided with various polygonal (i.e. hexagonal) shank configurations relative to one another to prevent rotational movement after the parts have been telescopingly connected. In such cases, various pin fasteners have been provided with drilled holes to prevent parts from axial separation. That is, to prevent the parts from pulling apart. It has also been known to utilize various spring-clip fasteners for detachably holding the parts together. One such spring-clip design is illustrated, for example, in the U.S. Pat. No. 4,190,428.

DISCLOSURE OF THE INVENTION

In the present invention there is provided a retainer system which is thought to overcome certain of the disadvantages and problems with prior devices and/or systems. In the present invention, the drill bit is provided with axial bore disposed to receive a cylindrical shanked portion of the drill steel. The axial bore is recessed to provide a key-way slot configuration constructed and arranged to receive a correspondingly configured key-way member formed unitary with and extending radially outwardly from the shank portion of the drill steel. In one form, the key-way slot configuration includes a pair of oppositely disposed, axially extending key-way slots which telescopingly mate with a pair of oppositely disposed, axially extending key-way members formed from and made unitary with the material of the shank portion of the drill steel. In another form, the key-way slot configuration includes a T-shaped slot having an axially extending portion which merges into a transverse radially extending portion and which portions are disposed to receive a single key-way member formed from and extending radially outwardly from the shank portion of the drill steel. In this form, the key-way member is telescopicly received into the T-shaped slot so that upon subsequent rotation of the bit relative to the drill steel, the component parts are automatically locked together to limit further rotational movement relative to one another and to prevent axial withdrawl of the drill bit relative to the drill steel in the installed position thereof.

BRIEF DESCRIPTION OF THE DRAWINGS

FIG. 7 is a side elevation view illustrating a modified form of the retainer system of the present invention;

FIG. 8 is an end elevation view looking in the direction of the line 8—8 of FIG. 7;

FIG. 9 is a vertical section view looking in the direction of the line 9—9 of FIG. 7;

FIG. 10 is an end elevation view looking in the direction of the line 10—10 of FIG. 7;

FIG. 11 is a vertical section view taken along the line 11—11 of FIG. 7;

FIG. 12 is a fragmentary, vertical section view taken along the line 12—12 of FIG. 10; and FIG. 13 is a fragmentary, enlarged section view illustrating a portion of the key-way number of FIG. 9.

BEST MODE FOR CARRYING OUT THE INVENTION

Figure 1:
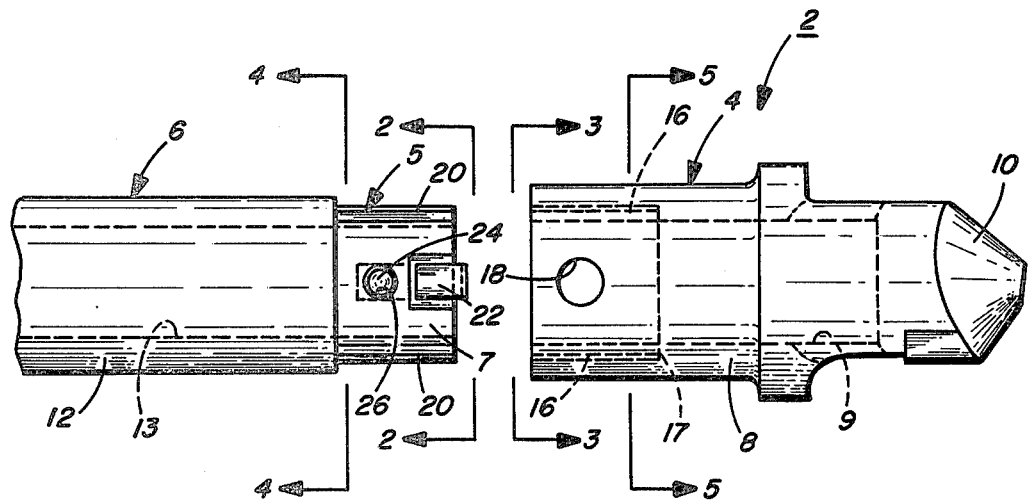
FIG. 1 is a side elevation view illustrating the retainer system of the present invention and depicting a cutter bit aligned for detachable connection to the end of a drill steel member.

Referring again to the drawings and in particular to FIG. 1 thereof, there is illustrated the retainer system of the present invention of the type which may be utilized, for example, with a drill rod system. Such system is illustrated in applicant's U.S. Pat. No. 4,313,506 granted in the name of Thomas L. O'Connell. As generally shown, the retainer system, designated generally at 2, includes a cutter bit 4 disposed for detachable connection to a drill steel 6. In accordance with the invention, the cutter bit 4 and drill steel 6 are detachably connected by means of an interlocking retainer system, as will hereinafter be more fully described.

In the embodiment illustrated, the cutter bit includes a cylindrical body portion 8 which has an axially extending cylindrical bore, as at 9, extending therethrough and opening at one end remote from the cutting tip, as at 10. The cutter tip may be of a solid construction as illustrated in U.S. Pat. No. 3,554,306 or may be of a hollow construction with dust receiving passageways as illustrated, for example, in applicant's aforesaid U.S. Pat. No. 4,313,506.

In the embodiment illustrated, the cylindrical body portion 8 is formed at one end with a counter-sunk cavity, as at 16 which may be of an enlarged diameter as compared to the axial bore 9 so as to define an interior annular shoulder, as at 17. This shoulder 17 is disposed approximately mid way along the axial length of the cylindrical body portion 8, and acts to provide a seat for one or more key-way members adapted to bottom-out thereon.

Figure 3:
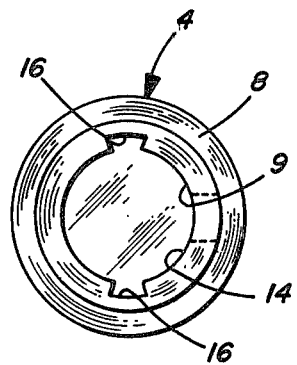
FIG. 3 is an end view looking in the direction of the line 3—3 of FIG. 1.
Figure 6:
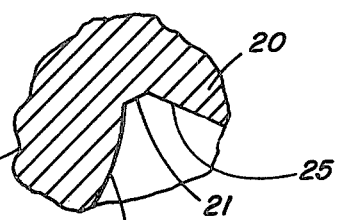
FIG. 6 is a fragmentary, enlarged section view illustrating a portion of the key-way member illustrated in FIG. 4.
Figure 5:
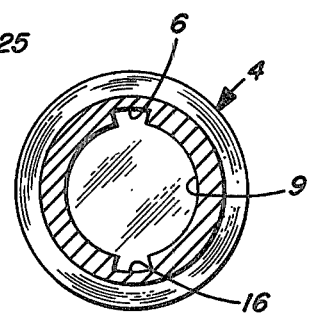
FIG. 5 is vertical section view taken along the line 5—5 of FIG. 1.

As best illustrated in FIGS. 3, 5 and 6, the axial bore 9 is provided preferably with one or more axially extending key-way slots, as at 16, which extend throughout the length of the counter-sunk cavity 16. It is preferred that there be two oppositely disposed key-way slots which are designed for sliding registration with a pair of elongated key-members 20 provided on the drill steel 6.

Figure 2:
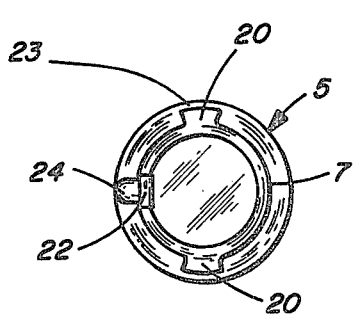
FIG. 2 is an end elevation view looking in the direction of the line 2—2 of FIG. 1.
Figure 4:
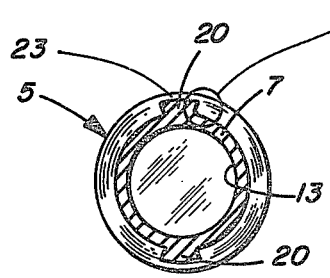
FIG. 4 is a vertical section view taken along the line 4—4 of FIG. 1.

As best illustrated in FIGS. 1, 2 and 4, the drill steel 6 has a cylindrical body 12 with a cylindrical passageway 13 extending therethrough. The body is provided with a unitary, reduced diameter shank portion 5 from which is formed the key members 20. The key members 20 may be cast or machined and preferably have a radial thickness so as to be slightly less than the corresponding cross-diameter of the cylindrical body member 12 as best illustrated at 23 in FIG. 2 and 4.

The shank member 5 has the cylindrical body 20 with a cylindrical outer surface, as at 7, so that the key members 20 have generally planar inclined side surfaces, as at 25, which convergently merge, as at 21, into a radius to adjoin the cylindrical outer surface 7, as best illustrated in the enlarged fragmentary illustration of FIG. 6.

In this embodiment, to further facilitate the detachable coupling connection, there is provided a spring-fastener of the type disclosed in U.S. Pat. No. 4,190,128. As illustrated, this fastener has a side port 24 which receives a button 26 of a U-shaped spring fastener 22. The fastener 22 is inserted over the edge of the body portion 7 of the shank member 5 such that depressing of the button 26 out of a registering hole, as at 18, in the bit acts to enable the bit to be removed from the drill steel member 6.

In the invention, it will be seen that the key-members 20 are symmetrically aligned in a 90° off-set relation from the spring fastener and have a length sufficient to bottom-out on the shoulder 17 provided within the cavity 16 of the bit 4.

Referring now to FIGS. 7 through 13, there is illustrated a modified form of the retainer system wherein like parts are referred to by like reference numerals but with the prime designated added for purposes of clarity. Generally and as best illustrated in FIG. 7, the retainer system, designated generally at 2, includes the bit member 4' having a cylindrical body portion 8' and with an axial bore extending therethrough, as at 9'. In this embodiment, however, the bore of the cylindrical body member 8' is provided with a T-shaped slot defined by an axially extending portion 30 which merges into a radially extending portion 32, as best illustrated in FIG. 12. This T-shaped slot provides a key-lock adapted to slideably receive therethrough a key member 34 provided on the body portion 7' of the shank 5' of the drill steel member 6'. Here again, the drill steel member has a cylindrical body 12' with an interior cylindrical passageway 13', as aforesaid. In this form, the key member 34 as best illustrated in FIG. 13, merges into the cylindrical surface 7' at a chamfer surface 21'. Preferably, the radially extending portion 32 of the slot is semi-circular in configuration so as to extend approximately 180° in respect to the bore 9', as best illustrated in FIG. 11. Accordingly, in this embodiment the T-shaped key lock operates to receive the key member 34 by axial sliding movement through the axial portion 30 and then by rotating the drill steel member 6' in clockwise or counter-clockwise direction there is provided a connection which not only prevents rotational movement between the components but which also prevents axial removal of the drill bit relative to the drill steel. Moreover, in such embodiment there is no requirement to provide the spring-fastener of the type illustrated in FIG. 1, for example.

Other further advantages and objects of the present invention will become apparent when taken in conjunction with the appended claims.

We claim:

1. A retainer system for detachably coupling a drill bit member to a drill steel member or the like comprising a drill bit member having a cutting tip at one end and having an axial bore formed therein and adapted to slidably receive a shank portion of a drill steel member, said bit member having an elongated cylindrical body portion formed with a generally T-shaped key-way slot configured so as to be recessed radially to a greater depth than said bore, said key-way slot having an axially extending portion extending from the open end of said cylindrical body portion and merging into a radially extending slot portion, said radially extending slot portion having a substantially greater arcuate length than the actual length of said axially extending portion, said drill steel member having a unitary cylindrical shank portion and an outwardly extending key-way member of a one-piece construction merging with said shank in an arcuate direction by a chamfer means, and made unitary with said shank portion and having a radial length slightly less than the corresponding radial dimension of the actual portion of said key-way slot so as to be slidably received therethrough and into the radial portion of said key-way slot so as to limit rotational movement of said bit and drill steel members relative to one another and to prevent axial movement of said bit member relative to said drill steel member in the installed position thereof.

2. A retainer system in accordance with claim 1, wherein the radial portion of said key-way slot is of a semi-circular configuration and extends about 180° relative to the axial bore in the cylindrical body of said bit member.

* * * * *